March 24, 1970 R. KOMPFNER 3,503,070

ANTI-DOPPLER SHIFT ANTENNA FOR MOBILE RADIO

Filed April 1, 1969 5 Sheets-Sheet 1

INVENTOR
R. KOMPFNER
BY Roy M. Porter Jr.
ATTORNEY

March 24, 1970 R. KOMPFNER 3,503,070

ANTI-DOPPLER SHIFT ANTENNA FOR MOBILE RADIO

Filed April 1, 1969 5 Sheets-Sheet 2

ANTI-DOPPLER SHIFT ANTENNA FOR MOBILE RADIO

United States Patent Office 3,503,070
Patented Mar. 24, 1970

3,503,070

ANTI-DOPPLER SHIFT ANTENNA FOR MOBILE RADIO

Rudolf Kompfner, Middletown, N.J., assignor to Bell Telephone Laboratories, Incorporated, Murray Hill and Berkeley Heights, N.J., a corporation of New York Filed Apr. 1, 1969, Ser. No. 812,083
Int. Cl. H04b *1/10;* H04q *1/32*
U.S. Cl. 343—100 14 Claims

ABSTRACT OF THE DISCLOSURE

A number of individual antenna probes are affixed to a continuous track which is movably mounted on a car. The track is driven at the same speed as the car and consequently the portion of the track aligned with the line of the car's motion but moving in the opposite direction will remain stationary with respect to the ground for a finite time period. Switching is provided so that the antenna attached to the temporarily stationary portion of the track is always connected to the car's mobile radio equipment. The stationary antenna is unaffected by Doppler shift.

BACKGROUND OF THE INVENTION

This invention relates to antenna systems, and more particularly to mobile radio antennas which eliminate the Doppler shift caused by continuous movement of a mobile vehicle.

As the number of subscribers of mobile radio communication systems increases, the need for increased capacity necessitates greater frequency allocation and hence use of higher and higher portions of the spectrum. A moving radio station receiving from and transmitting to a fixed station gives rise to Doppler shift and as the frequencies allocated to mobile communication systems are pushed higher and higher, the Doppler phenomenon will likely give rise to intolerable effects. Though it is inherent in the nature of the transmission between a moving and a fixed antenna that Doppler shift will occur, it is the object of this invention to provide a mobile antenna system which will act as if it is stationary and hence be unaffected by the Doppler phenomenon.

SUMMARY OF THE INVENTION

In accordance with the invention, a series of antenna probes are mounted on a mechanically driven track so that at all times at least one of them is stationary with respect to the environment, notwithstanding the direction nor speed of the vehicle on which they are mounted.

One portion of the path which the track follows is aligned with the direction of normal vehicular motion. The track is driven at the same speed as the vehicle with the track traveling in a direction opposite to that of the vehicle when traversing the aligned portion of the path. Hence, when the vehicle moves forward the track along the aligned portion of the path moves backward at an identical speed and is effectively stationary relative to the environment. An antenna probe attached to the track at a given point is therefore stationary and unaffected by Doppler shift when the point is traversing the aligned portion of the path. A series of antennas is distributed along the track and selective switching among them insures that a stationary one is connected to the mobile radio equipment at all times.

DETAILED DESCRIPTION

In accordance with the present invention antenna apparatus, which couples with free space electromagnetic radiation at an effective point, is mounted on a vehicle. This point is maintained in a fixed position relative to the environment while the vehicle to which the apparatus is attached is moving relative to that environment. As will be described hereinafter with reference to the drawings, the antenna is attached to a moving track which operates on mechanical principles similar to those of a caterpillar track on such machines as a bulldozer or tank.

In the case of the caterpillar track while the machine is moving the portion of the track lying on the ground is quasi-fixed; that is, it is temporarily stationary relative to the ground. As the machine moves each successive quasi-fixed point on the track is pulled up from the ground and advanced in the direction of the machine's motion until it is again replaced on the ground at a new location. While the machine advances each point on the track is quasi-fixed at a new location along the path of the machine's motion.

Figure 1:
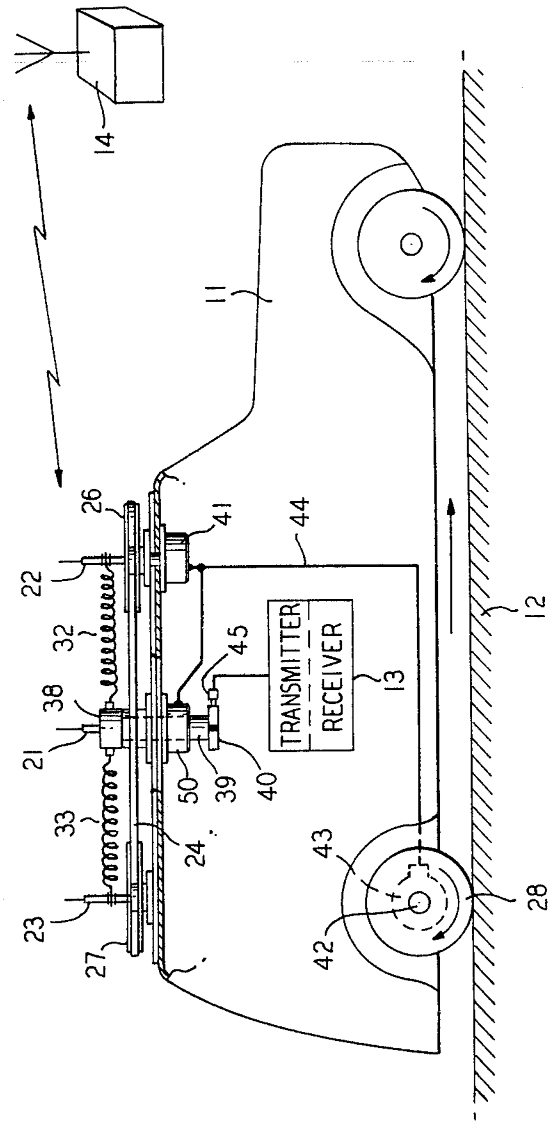
FIG. 1 is a sketch of a mobile radio equipped vehicle on which is mounted an antenna system in accordance with the invention.
Figure 2:
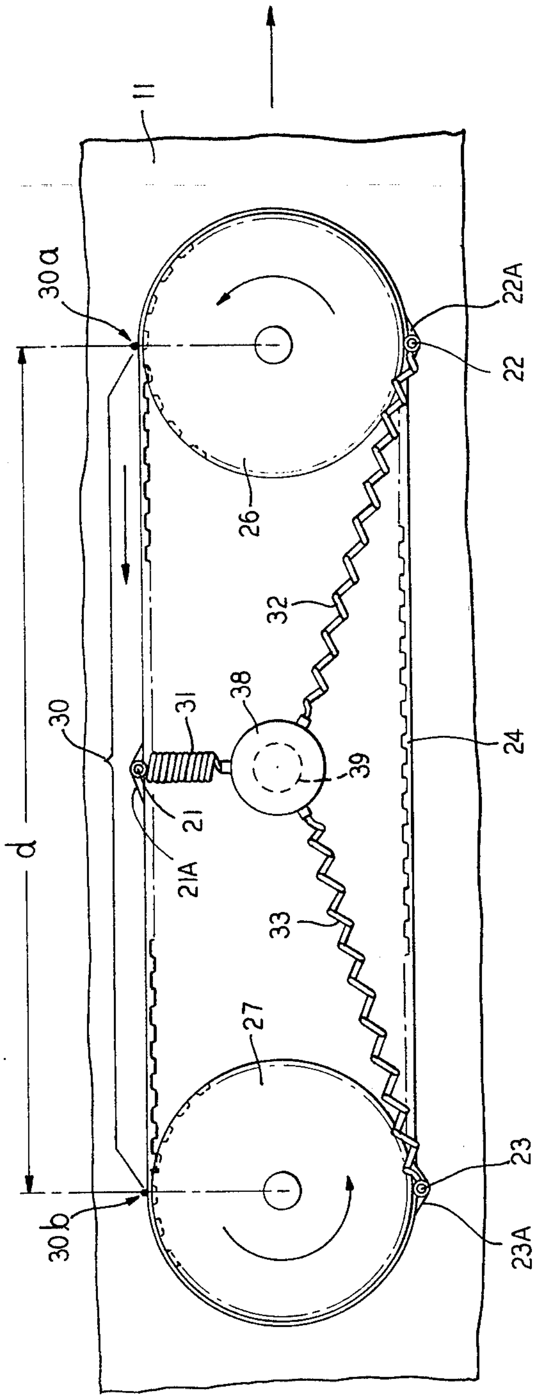
FIG. 2 is a plan view of the system of FIG. 1.

Similarly, in the present invention a track is mounted on the top of the vehicle and is driven so that one section of the track is quasi-fixed while the vehicle is moving. As the process continues the points on one quasi-fixed section are subsequently replaced by other quasi-fixed points. Referring to FIGS. 1 and 2, vehicle 11 is shown traveling left to right over the ground 12 which represents the stationary environment. Dipole antenna probes 21, 22 and 23 receiving from and transmitting to base station 14, are each permanently fixed to track 24 and displaced along track 24 at equal intervals. The probes may be affixed by such means as epoxy cement and additional support may be provided by braces such as 21A, 22A and 23A.

Track 24 is a belt which is rotably supported by a pair of wheels, drive wheel 26 and return wheel 27. Drive wheel 26 is driven at a speed so that track 24 moves relative to vehicle 11 at the same speed as vehicle 11 moves relative to the ground 12. Wheels 26 and 27 are appropriately matched to belt 24 such that there is no slippage between the belt and the wheels. For example, belt 24 may be a toothed belt, in which case wheels 26 and 27 would be appropriately toothed as illustrated.

Wheel 26 may be driven by a conventional servo system which is represented as constituting synchronous motor 41 connected to wheel 26, sensor 43 activated by the rotation of the vehicle's powered axle 42, and conductor 44 connecting the motor-sensor combination. Under control of sensor 43, motor 41 turns wheel 26 at a speed proportioned to the speed of wheel 28 on axle 42 so that the circumferential linear speed of wheel 26 is always identical with the speed of vehicle 11.

Where wheels 26, 27 and 28 are all the same size as illustrated, that is, they have the same radius $r$ and the centers of wheels 26 and 27 are separated by a distance $d=2\pi r$, then the total length of belt 24 is $3(2\pi r)$. In one turn of wheel 28, vehicle 11 will advance $2\pi r$ or the circumference of wheel 28. If drive wheel 26 is driven at the identical speed of wheel 28, belt 24 moves along its path a like distance $2\pi r$, or $d$, in the time wheel 28 rotates once. The aligned portion 30 of the path extends from the tangent point 30*a* of wheel 26 to tangent point 30*b* of wheel 27. Thus, the length of the aligned portion 30 is equal to the separation $d$. Since $d$ is one-third the total length of belt 24, three antenna probes equally spaced along belt 24 will insure that one will be on the backward moving portion 30 at all times.

Wheels 26 and 27 may differ in size from wheel 28. If they are smaller (larger) wheel 26 must be driven faster (slower) so that the speed of the linear motion imparted to belt 24 is identical to the speed of vehicle 11. If belt 24 is a different length, i.e., it is not 3(d), then appropriate adjustment in the number of antenna probes is required; if the length $d$ of aligned portion 30 is less than one-third the belt length, than more then three antenna probes will be required. However, fewer than three antenna proves will not provide continuous connection with a quasi-fixed antenna as the aligned portion 30 between tangent points 30*a* and 30*b* is inherently less than one-half the belt length. Thus, a separation $d$ greater than one-third the belt length is not advantageous.

Antenna probes 21, 22 and 23 are attached electrically to one end of flexible length connectors 31, 32 and 33, respectively, which may be, for example, flexible coaxial cables as illustrated or sliding coaxial joints often called line stretchers. The inner and outer conductor of such coaxial connectors are each attached electrically to one pole of the dipole antenna. The connector must, of course, be able to expand and contract in length as belt 24 is driven by wheel 26. The opposite ends of each of the connectors 31, 32 and 33 are mechanically fastened to and electrically insulated from flange 38 of rotating shaft 39, causing connectors 31, 32 and 33 to rotate with shaft 39. The combination of commutator 40 and brush 45 represents a rotary connector and selective switch for making appropriate electrical connection of the moving probes 21, 22 and 23 to radio equipment 13 which is fixed relative to vehicle 11. Equipment 13 includes conventional transmitter-receiver equipment preferably arranged for duplex operation.

Figure 3:
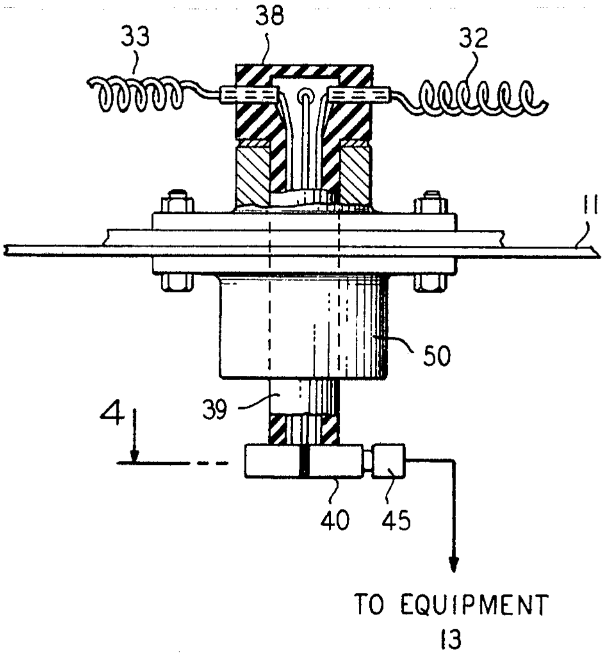
FIG. 3 is an enlarged fragmentary view illustrating a schematic representation of a rotary connector and selective switch in the system of FIG. 1.
Figure 4:
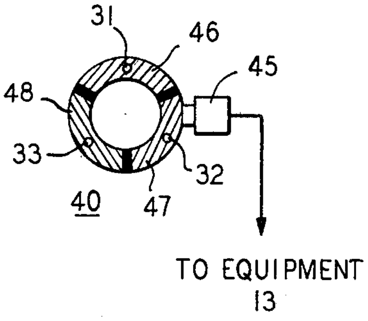
FIG. 4 is a cross-sectional view of the segmented commutator of FIG. 3.

FIGS. 3 and 4 illustrate the representative commutator-brush combination which performs the dual function of rotary connector and selective switch. Commutator 40 has conductive segments 46, 47 and 48 connected via connectors 31, 32 and 33 to antenna probes 21, 22 and 23, respectively. Connection to radio equipment 13 is represented as being provided by brush 45, but it is to be clearly understood that the frequencies involved would determine the specific type of hardware used. Brush 45 is mounted to make successive electrical contact with each segment of commutator 40 as shaft 39 rotates, and it must be arranged so that the conductive segment 46, 47 or 48 which is in contact with brush 45 is associated with the quasi-fixed antenna. Where three antennas are used, each conductive segment subtends an arc slightly less than 120 degrees and is insulated from the others.

Shaft 39 may be rotated by a motor 50 which is a geared down duplicate of motor 41 and is also controlled by sensor 43. Controlled rotation of shaft 39 is required in order to obtain proper switching among the antennas. If the belt length is, for instance, three times the circumference of drive wheel 28 on vehicle 11, shaft 39 should be made to rotate at one-third the speed of wheels 26 and 28.

In lieu of constructing a segmented commutator suitable for switching RF or in order to avoid commutation for any other reason, selective switching may be performed by alternative means. Continuous rotary connection between the antenna probes and the radio equipment would have to be provided by other means, such as a coaxial connector, but switching alone could be accomplished by a conventional selector circuit sequentially gating the signal on each connector 31, 32 and 33 to equipment 13.

Figure 5:
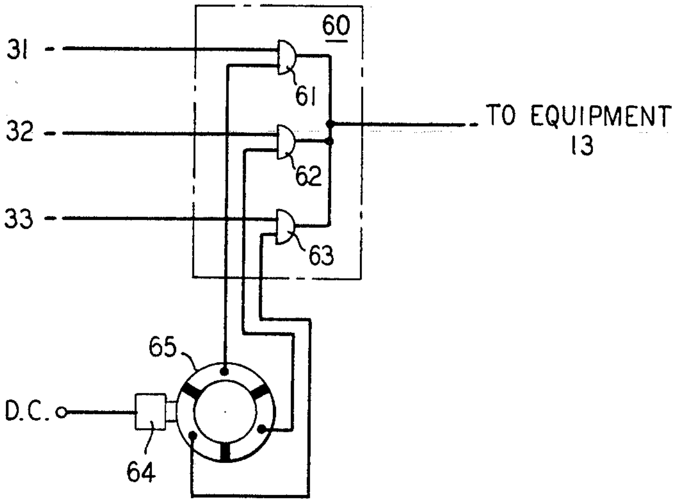
FIG. 5 is a representation of an alternative selective switch for the system of FIG. 1.

A suitable circuit 60 is shown in FIG. 5. Each gate 61, 62 and 63 could, for instance, be successively operated by an appropriately applied DS enable signal. If for example, circuit 60 is located within rotating shaft 39, the enable signal could be provided through brush 64 to a commutator 65 which is similar to commutator 40 in FIGS. 3 and 4. Communtator 65 rotates with shaft 39 so that the gates are enabled as their corresponding probes 21, 22 and 23 reach portion 30, thus producing the same switching as would be created by segmented commutator 40 and brush 45.

Figure 6A:
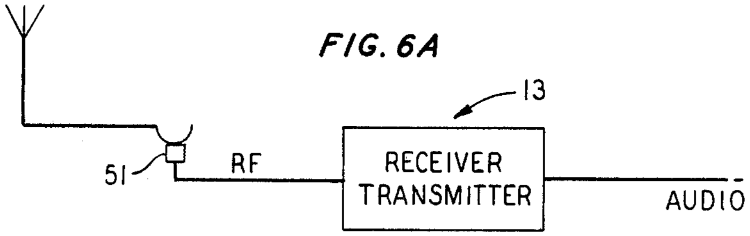
FIGS. 6A, 6B and 6C are sketches illustrating alternative circuit locations for the rotary connector in accordance with the invention.
Figure 6B:
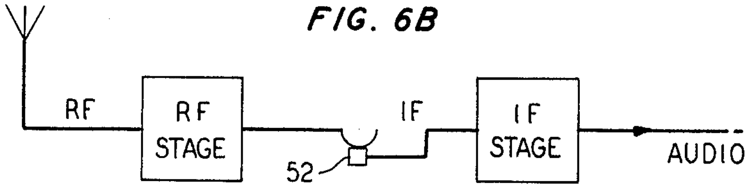
Figure 6C:
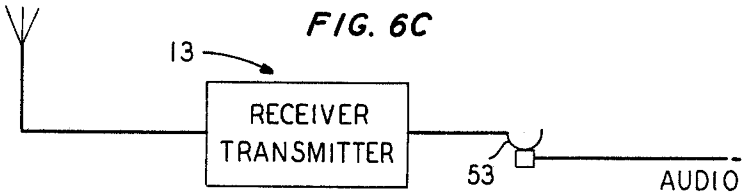

In the above described embodiments the rotary connection occurs at RF as indicated by rotary connector 51 in FIG. 6A which represents the loop associated with the quasi-fixed antenna probe. However, the rotary connection may occur at any point in the loop. For example, since IF (intermediate frequency) is less susceptible to interference a substantial improvement can be made by converting the received RF to IF near the antenna rather than delivering RF to radio equipment 13. Therefore, rotary connection of the received signal may be provided at IF as illustrated by connector 52 in FIG. 6B. Of course, the rotory connection could also occur at audio frequency as indicated by connector 53 in FIG. 6C.

Implementation of the modifications shown in FIGS. 6A, B and C require placing some or all parts of radio equipment 13 (including the selective switch) in the rotating portion of the path from the probe to the rotary connector. Where necessary this implementation would also entail providing additional appropriate delivery of power to the rotating parts. In light of modern integrated circuit techniques placing the required circuitry within, for instance, shaft 39 is apparent to one skilled in the art.

Figure 7:
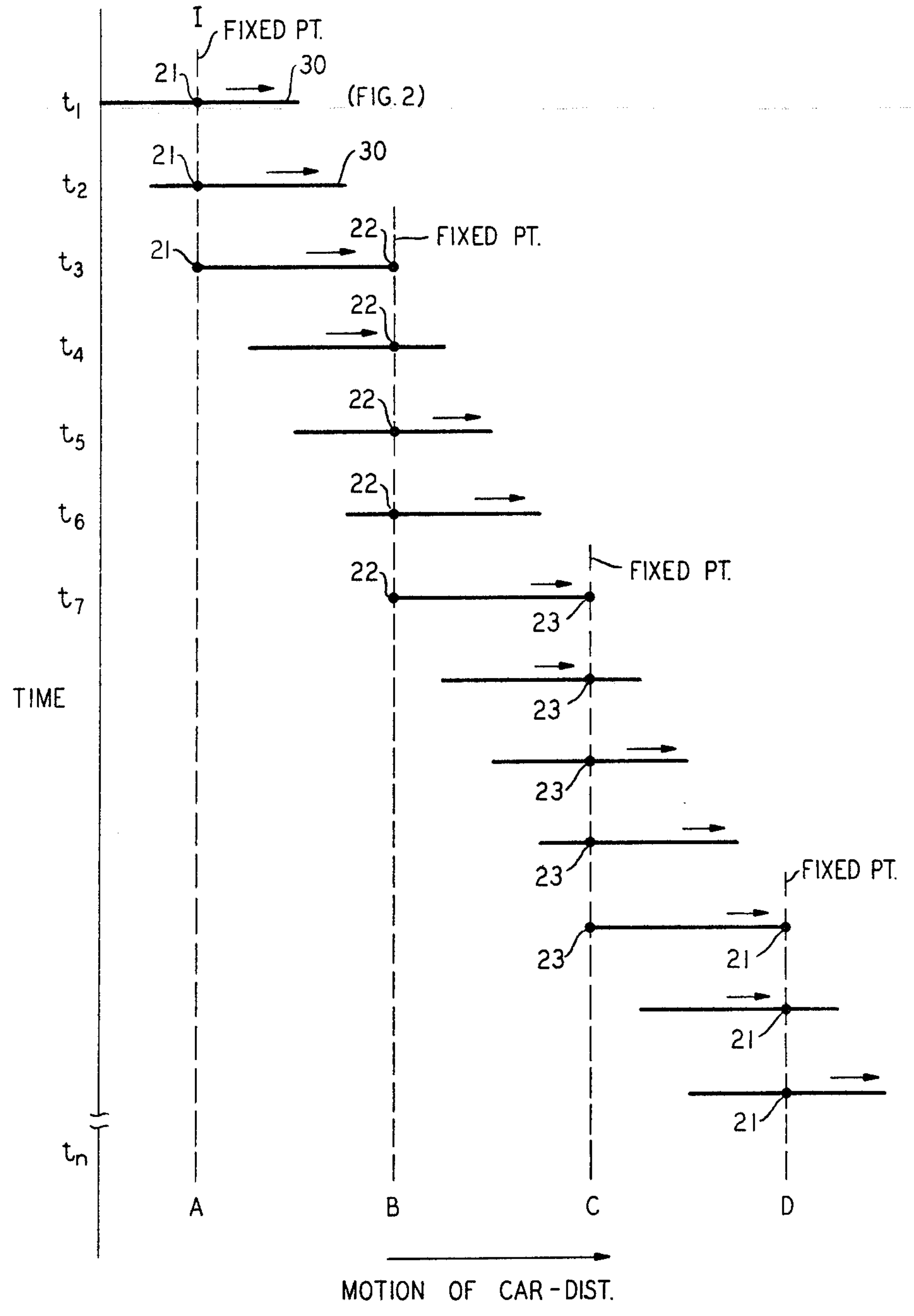
FIG. 7 is a graphical presentation of the overall functioning of the antenna system in accordance with the invention.

FIG. 7 illustrates the overall operation of the invention. The aligned portion 30 of the path on vehicle 11 is represented in successive times $t_1$, $t_2$ . . . $t_n$ by horizontal lines. At time $t_1$, antenna probe 21 is quasi-fixed at location A. In this initial position the antenna probes are located as indicated in FIG. 2. At time $t_2$, while vehicle 11 has advanced, antenna 21 remains quasi-fixed at location A. At time $t_3$ while vehicle 11 has advanced further, antenna 21 remains quasi-fixed at location A which is now the tangent point 30*b* of the aligned portion 30 and antenna 22 appears simultaneously at location B which is tangent point 30*a*. In succeeding times vehicle 11, passes location A and antenna 22 remains quasi-fixed at location B until time $t_7$ when antenna 23 becomes fixed at location C. It is evident from FIG. 7 that as vehicle 11 moves to the right in successive time periods, at least one of the antennas is always fixed at, for instance, locations A, B, etc., for a finite length of time.

In all cases it is to be understood that the above described arrangements are merely illustrative of a small number of the many possible applications of the principles of the invention. Specifically, the invention is not limited to an antenna system having three probes nor to drive wheels of identical size with the vehicle's wheels, but numerous and varied other arrangements in accordance with the principles of the invention may readily be devised by those skilled in the art.

What I claim is:

1. Antenna apparatus for use on a vehicle having mobile radio equipment associated therewith comprising antenna means movably attached to said vehicle, driving means for imparting linear motion to said antenna means relative to said vehicle identical in speed and opposite in direction with the linear motion of said vehicle relative to the environment about said vehicle, and means connecting said antenna means to said mobile radio equipment.

2. Antenna apparatus as claimed in claim 1 wherein said antenna means is affixed to a moving track which is driven mechanically.

3. Antenna apparatus as claimed in claim 2 wherein said moving track is a continuous belt and said driving means includes a pair of wheels rotably mounted on said vehicle to move said track at a speed identical with the speed of said vehicle.

4. Antenna apparatus as claimed in claim 2 wherein at least a portion of said means connecting said antenna means to said mobile radio equipment is rotating and includes a flexible length connector.

5. Antenna apparatus as claimed in claim 4 wherein associated with said rotating portion of said connecting means and rotating therewith is a part of said radio equipment.

6. Anti-Doppler shift antenna apparatus for use on a vehicle having mobile radio equipment associated therewith comprising, a continuous track mounted to said vehicle, at least a portion of said track being parallel to the line of motion of said vehicle, driving means for imparting linear motion to said track relative to said vehicle identical with the linear motion of said vehicle relative to the environment about said vehicle, a plurality of antenna means spaced along and affixed to said track so that at least one of said plurality of antenna means is on the portion of said track which is parallel to the line of motion of said vehicle, and means selectively connecting each of said plurality of antenna means to said mobile radio equipment.

7. Antenna apparatus as claimed in claim 6 wherein said plurality of antenna means includes at least three antenna probes equally spaced along said track, said driving means includes a pair of wheels supporting said track, said wheels being dimensioned and positioned such that the length of said portion of said track which lies parallel to the line of motion of said vehicle is substantially equal to the circumference of one of said wheels.

8. Antenna apparatus as claimed in claim 6 wherein said means selectively connecting each of said plurality of antenna means includes a rotary connector and associated with said connector and rotating therewith is a portion of said radio equipment.

9. Antenna apparatus as claimed in claim 6 wherein said means selectively connecting each of said plurality of antenna means includes selective switching means for connecting to said mobile radio equipment said each antenna means exclusively while said each antenna means is on said parallel portion of said track.

10. A mobile radio system comprising a base station, a mobile vehicle, transmitter-receiver equipment within said vehicle, antenna means movably attached to said vehicle, driving means for imparting linear motion to said antenna means relative to said vehicle identical in speed and opposite in direction with the linear motion of said vehicle relative to the environment about said vehicle, and means connecting said antenna means to said transmitter-receiver equipment.

11. Vehicle-mounted antenna apparatus for eliminating Doppler shift attributable to the motion of said vehicle comprising antenna means attached to said vehicle for coupling with free space radiation at an effective point, and means for causing said point to remain for a finite time period stationary relative to the environment about said vehicle regardless of the motion of said vehicle.

12. Antenna apparatus as claimed in claim 11 wherein said means for causing said point to remain stationary includes means for imparting to said point linear motion relative to said vehicle identical in speed and opposite in direction with the linear motion of said vehicle relative to the environment about said vehicle.

13. Anti-Doppler shift antenna apparatus for use on a vehicle comprising antenna means attached to said vehicle for coupling with free space radiation at a plurality of successive quasi-fixed locations and means for imparting successively to each of said quasi-fixed locations linear motion relative to said vehicle identical in speed and opposite in direction with the linear motion of said vehicle relative to the environment about said vehicle.

14. A mobile radio system comprising a base station, a mobile vehicle having radio equipment associated therewith, antenna means attached to said vehicle for coupling with electromagnetic energy at a quasi-fixed location, means for imparting linear motion to said quasi-fixed location relative to said vehicle identical in speed and opposite in direction with the linear motion of said vehicle relative to the environment about said vehicle, and means for transferring said energy between said qausi-fixed location and said radio equipment.

References Cited

UNITED STATES PATENTS 3,317,909 5/1967 Waetjen ---------- 343—100

RODNEY D. BENNETT, Jr., Primary Examiner

T. H. TUBBESING, Assistant Examiner

U.S. Cl. X.R.

325—65; 343—713